United States Patent Office 2,736,788
Patented Feb. 28, 1956

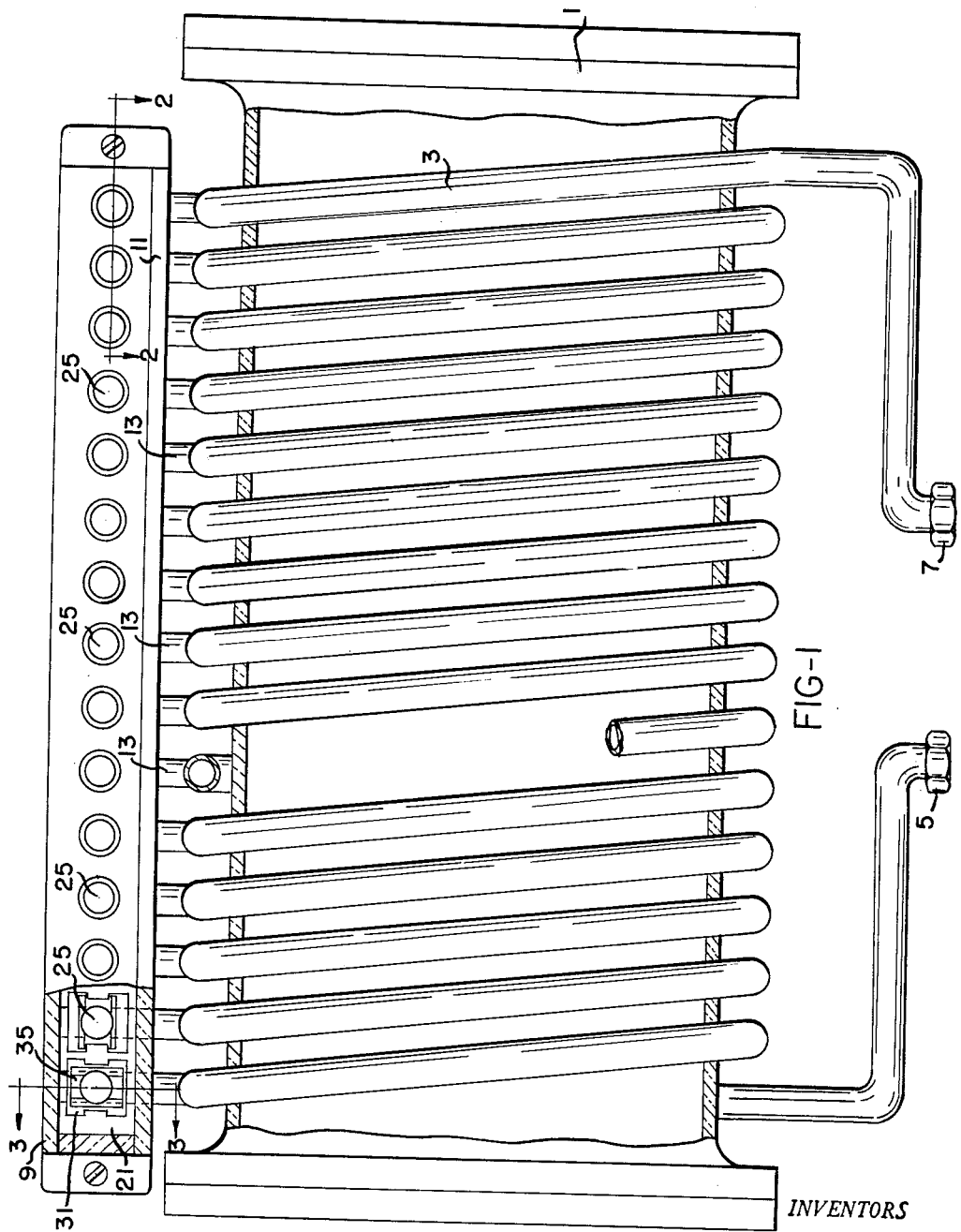

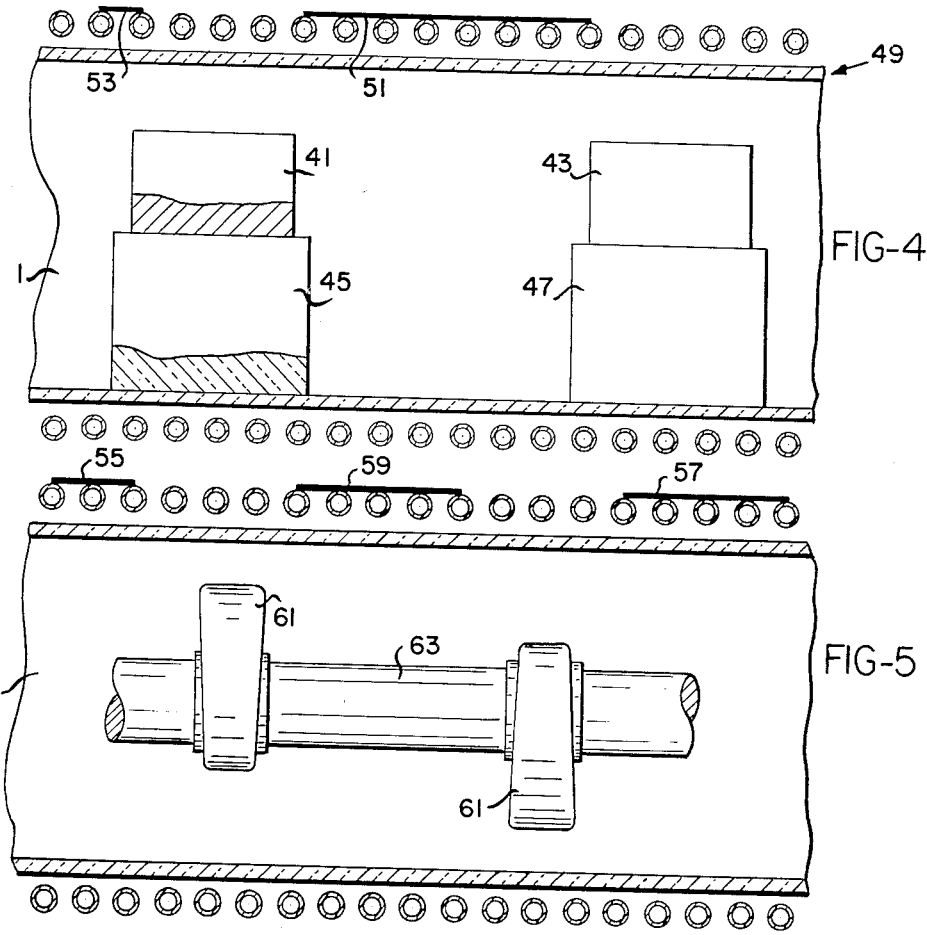
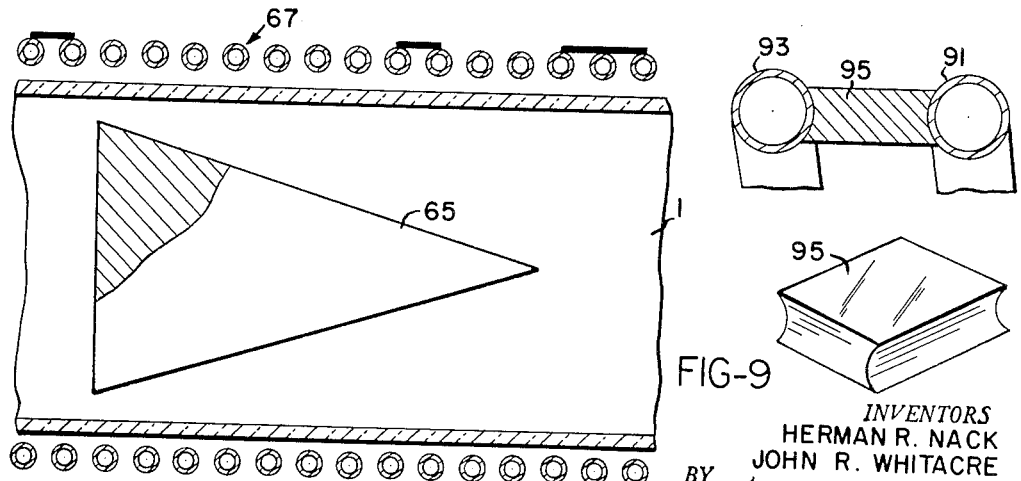

2,736,788
METHOD AND MEANS FOR INDUCTION HEATING COIL CONTROL

Herman R. Nack, Troy, and John R. Whitacre, Dayton, Ohio, assignors to The Commonwealth Engineering Company of Ohio, Dayton, Ohio, a corporation of Ohio Application December 27, 1952, Serial No. 328,190

5 Claims. (Cl. 219—10.75)

This invention relates to induction heating and particularly to a method and apparatus for controlling the application of heat.

Induction heat products are extensively used in industry and customarily a single induction heating coil is employed for each specific heating operation. Thus if it is desired to heat a plurality of separate portions of a single long shaft a separate coil is utilized generally to surround each of the portions of the shaft to be heated. Similarly, if it is desired to heat a plurality of objects to different temperatures at one time a separate coil is provided for each object.

This described arrangement is expensive, leads to the necessity of frequent equipment changes, and requires that a large number of coils be on hand in those industries where production of a single type of part required to be heated is limited.

It is a primary object of this invention to describe an arrangement for the control of induction heating effects of a single coil whereby different temperatures may be readily attained over given portions of a single piece to be heated or different temperatures may be attained for different objects positioned within one coil.

It is an important object of this invention to describe a process for the heating of separate and adjacent workpieces to materially different temperatures while the workpieces are positioned within a single coil.

It is a further object of this invention to provide a single induction heating coil for the uniform heating of irregularly shaped objects.

It is a principal object of this invention to describe a process for the inductive heating of specific portions of a workpiece contained within a coil.

These and other allied objectives of the invention will become more apparent in connection with the following detailed description and the accompanying drawings wherein:

Figure 1 illustrates in plan one embodiment of the invention in which a coil adapted to surround workpieces has associated therewith the novel apparatus of the invention;

Figure 7:
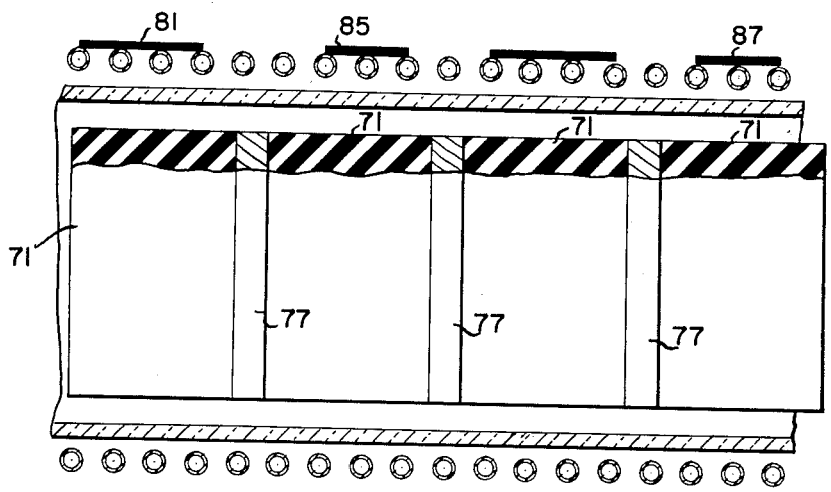
Figure 2:
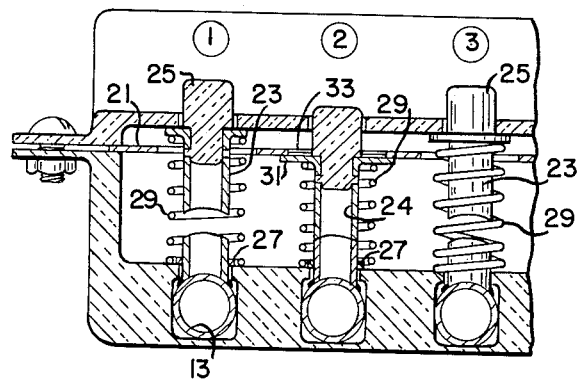
Figure 2 is an elevational view of the novel apparatus of Figure 1.

Figures 4 to 7, inclusive, illustrate schematically arrangements employing the device of invention;

Figure 8 is a view partially in section illustrating a further embodiment of the invention; and Figure 9 is a view of the metallic insert illustrated in Figure 8.

Referring to the drawings there is shown at 1 in Figure 1 a glass vessel having an inductive heating coil 3 surrounding the same, the coil being provided at 5 and 7 with connectors to a source of high frequency electrical heating supply (not shown).

The vessel 1 is particularly adapted for the receipt therein of workpieces and is a common piece of equipment in the field of gas plating wherein objects are heated in contact with a gaseous heat decomposable metal bearing compound to effect deposition of the metal on the objects. It will be understood therefore that the apparatus indicated in Figure 1 is representative of one embodiment of the invention only.

Referring again to Figure 1 there is shown a shallow box 9 having an upstanding back board 11. Positioned within the shallow base portion of the box 9 there are a plurality of electrical conductors 13 having contact faces 14 (Figure 3) and surrounded with electrical insulation 15. The box 9 is preferably made of wood, plastic or other insulating material and accordingly the insulation 15 is in these instances not necessary.

Figure 3:
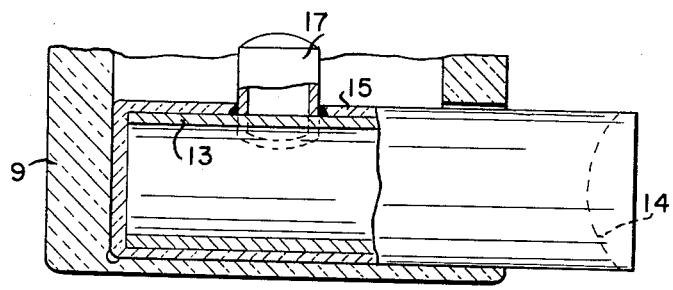
Figure 3 is a sectional view of an electrical lead useful in the practice of the invention.

As shown most clearly in Figure 3 a metallic plug 17 extends through the insulation 15 and is suitably soldered or otherwise secured in contact with electrical lead 13. Plug 17 extends through the upper wall 19 of the base of the box 9. As has been noted and as is clearly shown in Figure 1 the box 9 is provided with a plurality of these conductors 13.

Suitably secured between the end walls of the box 9 in an electrically insulated manner is an electrically conductive bar 21 having apertures through which metallic buttons 23 capped by plastic portions 25 extend. Button 23 is provided with a barrel 24 and is recessed at 33 to receive a tongue 31 of the bar 21 which projects into the aperture through which the button 23 passes. The tongue 31 and recess 33 constitute a locking means for the button 23 in the depressed position thereof.

A collar 27 of electrically insulating material surrounds each plug 17 and collar 27 together with barrel 24 constitute retaining means for a spring 29 which is adapted to return the movable metal button 23 to its upper position upon release of the tongue 31 and the recess 33 which is effected by merely turning button 23.

As will now be apparent from reference to Figure 1 for the operation of the device a single lead 13 is connected to a single turn of the coil 3 and with 14 leads and coil turns as shown in Figure 1 it is possible to operate the device to attain a wide variation in the temperature of objects positioned within the vessel 1. To effect this temperature control it is merely necessary to push the metal buttons 23 into contact with the metallic plugs 17 to thereby short out portions of the coil 3; thus, for example, if it is desired to merely heat an object in the central portion of the vessel 1, it is only necessary to eliminate the heating effects of the left and right hand end portions of the coil 3. This may be done, for example, by pushing the metal buttons 23 governing positions 1 to 4 and positions 11 to 14, as indicated in Figure 1, thereby with current passing through the coil the end portions are shorted out and substantially no heating takes place in these areas, the central portion of the coil however continues to operate and accordingly the required temperature may be attained in that area by selection of the power input.

Figures 4 to 7, inclusive, illustrate specific modes of operation of the device of invention. Thus in Figure 4 there are shown schematically two identical workpieces 41, 43 mounted in spaced insulating relation on supports 45, 47 and surrounded by the schematically illustrated longitudinally extending uniformly wound coil 49.

To heat the workpiece 43 to a higher temperature than the workpiece 41 while utilizing the same coil it is only necessary to short circuit or to bridge some of the coil turns surrounding the piece 41 as is indicated at 53. The turns so short circuited or so bridged will pass substantially no heat to the piece 41 and accordingly the temperature of the member 41 will be considerably lower than that of the piece 43 which is surrounded by turns each of which provides heat to the assembly.

It is to be further noted that in Figure 4 the central portion of the coil is shorted at 51 so that substantially no heat passes into the spacing between the workpieces.

Figure 5 illustrates the manner in which a structure such as a crankshaft may be heated at selected portions while other portions are substantially cool. Thus the left and right hand end portions of the shaft are shorted out as at 55, 57 and the central portion is shorted as at 59 so that substantially no heating of the crankshaft is effected by these turns of the coil. However, the turns of the coil which are adjacent the cranks 61 of the shaft 63 are not shorted out and accordingly considerable heat may be applied to the crank portions. It is of course to be understood that in any such operation, as is well known in the art, temperature conditions in the heating of such a piece are not allowed to attain equilibrium, but the heating is rather of very short duration so that very little conductive effects occur which of course would heat the main portions of the crankshaft.

Referring now to Figure 6 there is shown a conical body 65 positioned within a coil indicated generally at 67 the coil being adapted to effect sustantially uniform heating of the conical body as more heat will be required at the thicker base portion, only a few of the turns in this area are shorted out while as the apex of the cone is approached more turns are indicated as shorted. Not all turns however should be shorted out in such an arrangement since some heating must be effected at the cone tip generally in order to attain uniform heating of the whole piece. It is deemed to be clear however that by bridging some of the adjacent turns of the coil, in accordance with the load section of an object such as the cone 65, that irregular pieces may be readily uniformly heated. In this connection it is to be noted that the arrangement of invention has particular utility where the heating of such irregular pieces is for a short period of time since inductive effects which would tend to upset the uniformity are then substantially not present.

Figure 7 illustrates the manner in which a spring mounting may be formed, and the particular mounting illustrated comprises spaced metal plates between which are positioned varying thicknesses of rubber, the objective in the illustration being to heat the metal and rubber sufficiently at the interfaces to cure the metal to the rubber. While in such circumstances the rubber plies are not completely uniform, a tie-ply generally being used, it is not deemed essential to illustrate these details in the present case as such form no part of the invention. However it is desirable in all such cases, no matter what the particular arrangement may be, to heat quickly and to a high temperature at the areas where the metal joins the rubber and to apply as little heat as possible to the body of the rubber.

The coil arrangement of Figure 7 is adapted to effect this process since the turns of the coil 83 may be shorted out at the areas of the rubber body so that substantially no heat is produced in the rubber itself. Thus at 81 the coils are indicated as shorted and similarly, at 85 and 87; while in the remaining portions of the longitudinally extending uniform coil heat will be developed at the joints between the rubber and metal bodies to effect a complete and quick curing. This arrangement of the invention is of particular value where the thickness of rubber and the thickness of metal vary from spring to spring as the same uniform coil may be utilized for curing all such spring arrangements without the necessity of special adapters, etc., for it is only necessary to make the proper connections to the coil as indicated in Figure 1 to secure the desired heating result.

Figure 8 illustrates another means for attaining the objectives of the invention. Numerals 91, 93 indicate adjacent turns of the coil, while numeral 95 indicates a metallic insert, preferably shaped at the sides to conform to the contours of the coil turns. These inserts 95 may simply be positioned by hand between the turns of any standard coil to effect the short circuiting necessary to control the heating. The plugs need only be of short lengths as indicated in Figure 9, but of course should be of sufficient electrical capacity to effect the required shorting.

As a specific example of the manner in which the temperature may be controlled two identical workpieces consisting of cold rolled steel plate measuring 2" x 6" x ⅛" were placed on similar insulating supports as indicated in Figure 4 and positioned within the vessel 1 of Figure 1 a coil having 30 uniformly spaced turns was utilized, and at a power input of (7.5 kw.) a temperature of 900° F. was attained on one workpiece while a temperature of 1500° F. was attained on the other. The shorting in this instance was effected in the manner indicated in Figure 4, with the middle 5 turns being shorted, the 15 turns on the right being fully utilized, and 4 of the turns on the left hand end being shorted out.

It is to be noted that some care must be exercised with regard to tuning if optimum efficiency is to be obtained; however, very generally speaking the shorting of a few turns does not affect appreciably the tuning but does result in a considerable control over the temperature effect.

It will be understood that this invention is susceptible to modification in order to adapt it to different usages and conditions and accordingly, it is desired to comprehend such modifications within this invention as may fall within the scope of the appended claims.

We claim:

1. An arrangement for the control of induction heating effects comprising, a longitudinally extending induction heating coil having a plurality of turns, a series of electrically conductive means consisting only of electrical conductors equal in number to the turns of the coil, one single conductor being connected to each coil turn, an electrically conductive strip extending lengthwise of the heating coil and fixedly supported with respect to the coil and conductors, said strip being normally out of electrical contact with said conductors, and means movable in respect to and carried by said conductive strip to electrically connect adjacent conductors to the electrically conductive strip to short circuit the coil turns connected to said conductors.

2. An arrangement for the control of induction heating effects comprising, a longitudinally extending induction heating coil having a plurality of turns, a series of electrically conductive means consisting only of electrical conductors and equal in number to the turns of the coil, one single conductor being connected to each coil turn, an electrically conductive strip extending lengthwise of the heating coil and fixedly supported with respect to the coil and conductors, said strip normally being out of electrical contact with said conductors, an electrically conductive plug member carried by each conductor, the plugs being spaced from the said strip, movable electrically conductive bottons each constructed and arranged to contact a single said plug and the strip simultaneously, the movement of a pair of adjacent buttons being effective to short circuit adjacent coils.

3. An arrangement for the control of induction heating effects comprising a longitudinally extending induction heating coil having a plurality of turns, and a series of electrically conductive means consisting only of electrical conductors equal in number to the turns of the coil, one single conductor being connected to each coil turn, an electrically conductive strip extending lengthwise of the heating coil and fixedly supported with respect to the coil and said conductors, said strip being normally out of electrical contact with said conductors, an electrically conductive plug member carried by each of said conductors, the plug being spaced from said strip, movable buttons one positioned above each plug out of contact therewith and also out of contact with said strip, each button being movable to engage said strip and a single said conductor simultaneously, and means to retain each of said buttons in contact with a said strip and plug.

4. In an induction heating apparatus of the character described wherein selective portions thereof may be heated, said apparatus comprising a helically wound electric induction coil, said coil having a plurality of turns, there being spaced between adjacent turns, and an insert of electrically conductive material for positioning in said spaces between adjacent turns of the coil to short circuit said turns, said insert having a thickness less than the difference of the inner and outer radii of said coil whereby no portion of the insert projects outwardly of said coil when in position.

5. In an induction heating apparatus of the character described wherein selected portions thereof may be heated, said apparatus comprising a helically wound electric induction coil, said coil having a plurality of turns, there being spaces between adjacent turns, and means comprising an electrically conductive insert for positioning in said spaces between adjacent turns of the coil to short circuit said turns, said insert having grooved ends to conform to the contours of the coil turns.

References Cited in the file of this patent

UNITED STATES PATENTS

| | | |
|---|---|---|
| 2,452,197 | Kennedy | Oct. 26, 1948 |
| 2,490,104 | Strickland | Dec. 6, 1949 |
| 2,570,311 | Bohnet et al. | Oct. 9, 1951 |
| 2,655,590 | Gardner | Oct. 13, 1953 |
| 2,666,841 | Laver | Jan. 19, 1954 |

FOREIGN PATENTS

| | | |
|---|---|---|
| 549,363 | France | Feb. 8, 1923 |
| 669,842 | Great Britain | Apr. 9, 1952 |